D. C. JACKSON.
CIRCUIT FOR PROPAGATING WAVE FORMS.
APPLICATION FILED SEPT. 23, 1901.
936,538. Patented Oct. 12, 1909.
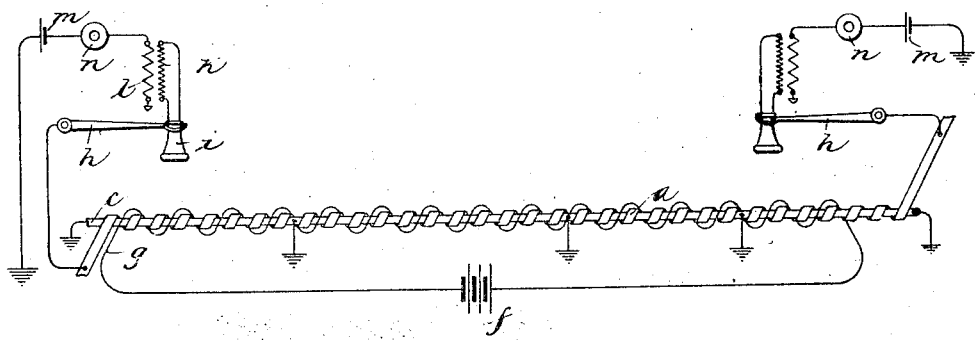
Witnesses:
Harvey L. Hanson.
May W. Label.
Inventor,
Dugald C. Jackson,
by Charles A. Brown, Cragg & Oilfield
Attorneys

UNITED STATES PATENT OFFICE.

DUGALD C. JACKSON, OF MADISON, WISCONSIN.

CIRCUIT FOR PROPAGATING WAVE-FORMS.

936,538.

Specification of Letters Patent.  Patented Oct. 12, 1909.

Application filed September 23, 1901. Serial No. 76,247.

*To all whom it may concern:*

Be it known that I, DUGALD C. JACKSON, citizen of the United States, residing at Madison, in the county of Dane and State of Wisconsin, have invented a certain new and useful Improvement in Circuits for Propagating Wave-Forms, of which the following is a full, clear, concise, and exact description, reference being had to the accompanying drawings, forming a part of this specification.

My invention relates to circuits for propagating wave forms, such as alternating or intermittent currents, and has for its object the provision of improved means whereby the electrostatic condition or stress existing between the sides of the circuit, commonly known as condenser effect, may be obviated. It is well known to those skilled in the art that where the sides of a circuit for conveying currents of this character are located close together, as, for example, in the same cable, in the case of metallic circuits, or where the metal side of a circuit is located close to the ground or other common return, a decay and distortion of the current arises, due to the electrostatic capacity. The mathematical theory of such decay and distortion has been set forth by such writers as Heaviside, and various attempts have been made to embody theories proposing correctives in commercial form. It has been proposed, for example, to solve the problem by introducing self-induction coils at regular intervals throughout the cables, the idea being to neutralize the electrostatic capacity by sections leaving the conductors of sections between the self-induction coils free of any characteristic tending to counteract the electrostatic condition that may arise between the self-inductance coils. I propose to overcome these defects heretofore existing in circuits designed to convey alternating and intermittent currents by forming the conductor that is to carry the current in a spiral to create inductance, this spiral formation being practically continuous throughout the entire circuit, or that portion of the circuit where the sides are closely associated physically and are thus likely to superinduce the undesirable electrostatic condition, whereby I am enabled to overcome the stress between the sides of the circuit. The conductor may be wound about a core that is preferably of magnetic material, composed of very fine wires of the softest iron, but, if desired, the core may be hemp or other like material, or an air core may be employed. Where a magnetic core is employed, the subdivision thereof into wires or strands is for the purpose of avoiding eddy currents, and the iron is made soft magnetically in order to avoid serious waste of energy through the effect of hysteresis.

My invention is susceptible of a variety of modifications and arrangements, and I will describe the same more fully in its broad and specific aspects, in connection with the acompanying drawing.

The drawing illustrates a grounded circuit, the major portion of its metallic side being in the form of a self-inductance spiral, telephonic apparatus being illustrated in the circuit as one type of current sending and receiving apparatus, and a supplemental circuit in association with the core of the spiral being indicated to increase the inductance.

In the case of telegraph lines extending by cables through large bodies of water, it is customary to ground the circuits. In such circuits the self-inductance is comparatively small, the outgoing conductor in each circuit being immersed in or placed very near the return side of the circuit, as in the case of an ocean cable, where the earth and the ocean water form the return side. In such circuits signaling by means of intermittent or alternating current is limited in speed because of the great electrostatic capacity of the circuits and the decay of the signaling current caused thereby. Such decay may be mathematically illustrated by the following formula:

$$C' = C \varepsilon^{-\frac{l}{10^5}(\pi f R S)^{\frac{1}{2}}} \quad \text{or} \quad \frac{C'}{C} = \varepsilon^{-\frac{l}{10^5}(\pi f R S)^{\frac{1}{2}}}$$

wherein $C$ represents an alternating current sent into a circuit composed as above. $C'$ represents the resulting current at a distance, say, of $l$ miles from the source, $\varepsilon$ is the numerical constant $2.7182+$, $\pi$ is the numerical constant $3.1416$, $f$ is the frequency of the alternating current, $s$ is the electrostatic capacity in microfarads per mile of circuit, and $R$ is the resistance in ohms per mile of circuit.

In telephony it is usual to employ complete metallic circuits, but the circuit conductors in the cables are twisted together in pairs to avoid mutual interference of the circuits (or cross talk), a consequence being that the self-inductance of each circuit is reduced to a comparatively small value, the mathematical formula above given applying approximately to such telephone circuits. To overcome the defects above pointed out, I introduce into the circuits, substantially throughout the same in an approximately uniform manner, self-inductance in a degree serving to partially or wholly neutralize the effect of the electrostatic capacity between the sides of the circuits and to sufficiently overcome the decay of the current. These undesirable features, the electrostatic capacity and its effect, the decay of the transmitted current, may be practically avoided if self-induction of the right value in comparison with the electrostatic capacity is chosen. The condition of decay of an alternating current in a circuit with self-inductance and capacity, when the resistance is not too great, may be shown by the following formula:

$$C' = C\varepsilon^{-\frac{Rl}{2\times 10^3}\left(\frac{S}{L}\right)^{\frac{1}{2}}} \text{ or } \frac{C'}{C} = \varepsilon^{-\frac{Rl}{2\times 10^3}\left(\frac{S}{L}\right)^{\frac{1}{2}}}$$

wherein L is the self-inductance (coefficient of self-induction) per mile of circuit, given in henries, the other symbols having the same meaning pointed out in connection with the first formula.

In practicing my invention, the necessary counteracting self-inductance is introduced into those portions of the circuit whose sides are close together, as, for example, when they are assembled in the form of metallic conductors in a single cable or where in a grounded circuit the metallic side lies close to the ground or other common return, so that the decay and distortion of the current may be reduced to any desired degree or entirely prevented.

The conductor of the cable is preferably in the form of a spirally wound ribbon of copper or aluminum $a$, as indicated in the drawing, particularly where grounded or common return circuits are employed. In the case of common return circuits the conductor may be insulated from its core or not, as preferred. If the cable is for underground or submarine use, it may be externally sheathed and insulated in the usual manner. Any of the well known ways of constructing the cable and insulating the same may be employed, and I do not, therefore, deem the detailed description thereof to be essential. The cable thus constructed may be laid with the same facility and by the same means as those now generally in use.

When the spirally formed conductor is provided with a continuous metallic core $c$, as indicated in the drawing, the core and spiral conductor may be conductively distinct, in which case the core may coöperate with the remaining side of the circuit and form a parallel path with the remaining side of the circuit. This arrangement is indicated in the drawing, where the metallic core is shown as being grounded at its ends and at intervals. The self-inductance of the conductor wrapped in a spiral, as described, may be derived with approximate accuracy from the following formula:

$$L = \frac{4\pi^2 n^2 D^2 \mu}{10^{20}}$$

wherein L is the self-inductance per mile of circuit in henries, $n$ is the total number of turns of conductor around the core per mile of circuit, D is the diameter of the core in mils, $\mu$ is the magnetic permeability of the core.

Submarine or other cables which serve to carry intermittent currents preferably should not be provided with a magnetic core, or if a magnetic core is employed it should be interrupted by narrow non-magnetic spaces at intervals, which preferably do not exceed a foot, in order that the retentiveness of the iron shall not reduce the apparent reactance with the intermittent current. It may be assumed that the iron has a permeability as high as 200 units at the very low degree of magnetization which may be caused by the signaling current, but the permeability may be increased to many times this value by introducing a special, steady magnetizing current. This arrangement is illustrated in the figure, where the special, steady magnetizing current is furnished from a source of direct current $f$, which is included in circuit with a conductor $g$, a portion of whose length surrounds the magnetic core and is spirally disposed. This supplemental circuit, including the battery $f$ and conductor $g$, serves to set up lines of force in the core, and in this manner increase the permeability in accordance with laws of magnetism that are well understood.

To illustrate the effect of my invention, I will assume a submarine cable of the prior art that is required to span a stretch of sea between two cities which requires 200 miles of circuit. If the cable is of the usual construction and the circuit has the following characteristics (which are within the limits of the ordinary practice), 10 ohms resistance per mile, .3 microfarads capacity per mile, and negligible self-inductance, then the value of $$\varepsilon^{-\frac{l}{10^3}(\pi RS)^{\frac{1}{2}}} \text{ becomes } \varepsilon^{-10.6} = .000025,$$

when $f$ is given the value of 300. In other words, if an alternating current which has a frequency of 300 periods per second is delivered to one end of this cable, only 25 millionths of that current will reach the far end. With a cable possessing the characteristics herein set forth, having a core of 400 mils effective diameter, while the spiral conductor has seventeen turns per yard or practically 30,000 per mile of cable, then $$L = \frac{4 \times 9.9 \times 9 \times 10^8 \times 16 \times 10^4 \times 200}{10^{20}} = .0114$$

henries.

The value of $$\varepsilon^{-\frac{Rl}{2\times 10^3}\left(\frac{S}{L}\right)^{\frac{1}{2}}} \text{ becomes } \varepsilon^{-5.1} = .0061.$$

Thus when an alternating current is delivered to one end of the cable, the portion which reaches the other end is over six one-thousandths of the original sending current. Such a cable gives very high speed for telegraph signaling and the transmitted signals are very little distorted. Such a cable is also adapted for telephonic communication, its application to this purpose being illustrated in the drawing.

In the drawing I have illustrated well known types of telephone substation apparatus, each station being provided with a telephone switch hook $h$, connected with a conductor $a$, a telephone receiver $i$ in a local circuit with the secondary $k$ of an induction coil, the primary $l$ of the induction coil being adapted for inclusion in the circuit with the conductor $a$ when the switch hook is relieved of the influence of a telephone receiver, a branch conductor including the primary $l$ also containing, in this instance, a battery $m$, in addition to the usual telephone transmitter $n$.

The clearness of the transmission of telegraphic or telephonic signals may be improved to any desired degree by increasing the self-inductance of the cable up to the point of completely neutralizing the capacity. This may be done, for instance, by increasing either the diameter of the core or its permeability. It may be also done by increasing the number of wraps or turns which the conductor makes around the core in each mile. Suppose that the magnetic permeability of the core is increased fourfold by some such plan as has been suggested above; then the value of the exponent in the expression $$\varepsilon^{-\frac{Rl}{2\times 10^3}\left(\frac{S}{L}\right)^{\frac{1}{2}}}$$

is reduced by one-half, and for the example set forth above the expression becomes $$\varepsilon^{-2.55} = .078.$$

A cable of this construction would admit of very effective telephonic communication.

Where the cable is used for telegraphy, it is preferable to construct it with a uniform core and use alternating currents for signaling. Satisfactory results may, however, be secured with intermittent currents, the core then being preferably interrupted as already described. A periodically intermittent function may be represented by a series of alternating functions, and therefore the deductions regarding the cables made heretofore with respect to the alternating current flow through them also apply to the intermittent flow. The use of these currents is well understood in telegraphy and I have not deemed it essential to show a receiving instrument for the alternating current. The frequency of 300 periods per second is the function of the highest frequency which need receive serious consideration when telegraphic signaling, even of comparatively high speed, is under consideration.

The foregoing description, while generically applicable to all circuits, is specifically applicable to circuits possessing grounded or common returns, illustrated in the drawing, one-half of each circuit being made up of a metal conductor. It is desirable, especially in telephony, and in the case of high pressure alternating current, to employ complete metallic circuits, to which the invention is equally applicable.

The outgoing and incoming conductors are both preferably spirally wound around a common core or axis in such directions that the magnetic effects of the outgoing and incoming currents on the core are added. Then the self-induction of the cable is dependent on the square of the number of turns in the outgoing and incoming limbs of the circuits, taken together. To mathematically illustrate the phenomena of such a circuit arrangement, suppose an underground telephone cable is made of copper wire or conductor which measures 22 ohms per mile and which, from the construction used, has an electrostatic capacity of .1 microfarads per mile of wire, and that there is 50 miles of wire. Suppose that it is desired to construct this cable in such a way that the decay of the current is indicated by $$\varepsilon^{-2.5}$$

Then the cable must be made with suitable self-induction so that the expression $$\frac{Rl}{2\times 10^3}\left(\frac{S}{L}\right)^{\frac{1}{2}}$$

reduces to 2.5. A solution of the equation $$\frac{22\times 50}{2\times 10^3}\left(\frac{.1}{L}\right)^{\frac{1}{2}} = 2.5$$

shows that L must be .0061 henries per mile of wire. Inserting this value of L and an assumed value of $n$ (say 30,000 turns per mile of wire) in the expression for the self-inductance which has been set forth above, it becomes possible to determine the diameter of the iron core that is required for the purpose. This gives $$.0061 = \frac{4\times 9.9 \times 9 \times 10^3 \times D^2 \times 200}{10^{20}}$$

and D=290 mils, which is the theoretical diameter of the iron core if the permeability of the iron is 200 units. It is not necessary to make the diameter of the core so great, however, in the case of telephony, because the self-inductance of the telephone instruments at each end of the line serves to assist in counteracting the effect of the capacity. This effect would make it possible to reduce the diameter of the core to perhaps not much exceeding 200 mils, without greatly injuring the telephonic transmission, or the diameter of the conducting wire, thus effecting a proportionate reduction in cost.

If it be assumed that the highest voice harmonic which it is necessary to preserve for satisfactory telephonic transmission results in an alternating current which has a frequency of 1,000 periods per second in a telephonic circuit, then the strengths of the telephonic transmission for the adjusted cable of the immediately preceding example and a cable of equal length of the usual form made of wires of equal size, would be in the relative proportions of $$\varepsilon^{-2.5} = .081 \text{ and } \varepsilon^{-4.1} = .017.$$

The first formula indicates a condition for satisfactory communication, while the latter indicates a condition that would be totally inoperative for telephonic purposes.

Any predetermined distribution of the resistance, self-inductance and capacity may be obtained. To this end the diameter of the conductor may be changed or the size of the core varied, or the pitch of the spiral adjusted, or various combinations of these changes may be effected, to produce the required result.

By providing inductance continuously throughout the cable I am enabled to secure far superior results to those hitherto attained.

Obviously my invention is designed to remove the objection heretofore existing to that part of an alternating current circuit likely to give rise to capacity. Those portions of an alternating current circuit that are not likely to cause disadvantageous capacity obviously need not be arranged in accordance with the invention, the invention herein relating primarily to that part of the circuit where the disadvantageous capacity is likely to exist, the inductance existing substantially continuously throughout this circuit portion.

In my Patent No. 789,738 issued May 16, 1905, I have shown and claimed a method for propagating wave forms employing apparatus disclosed in the present application.

I have herein particularly described my invention as adaptable for use in connection with cables containing conductors forming circuits including telephonic and telegraphic instruments, but I do not wish to be limited to the use to which the cables may be put, nor do I wish to be limited to the precise disclosure of the invention herein set forth, as modifications may readily be made without departing from the spirit thereof; but

Having thus described my invention, I claim as new and desire to secure by Letters Patent:—

1. A wave conducting circuit having a conductor and a magnetic core about which the conductor is disposed to produce inductance to counteract capacity, the said core being included in the circuit, and means for increasing the inductance.

2. A wave conducting circuit having a conductor and a core of magnetic material about which the conductor is disposed to produce inductance to counteract capacity, the said core being in metallic contact with the conductor, and means for increasing the inductance.

3. A wave conducting circuit having a conductor and magnetic material with which the conductor is associated to produce inductance to counteract capacity, and means for increasing the inductance, both the conductor and magnetic material being in the wave-conducting circuit.

4. A wave-conducting circuit having a conductor composed of highly conductive material and magnetic material mutually arranged to produce inductance to counteract capacity, and an additional circuit including the conductor for increasing the inductance.

In witness whereof, I hereunto subscribe my name this 26th day of Aug. A. D., 1901.

DUGALD C. JACKSON.

Witnesses:
C. F. BURGESS,
CHARLOTTE B. NORTON.